United States Patent [19]

Kataoka et al.

[11] Patent Number: 5,362,226
[45] Date of Patent: Nov. 8, 1994

[54] MOLD FOR SYNTHETIC RESIN MOLDING

[75] Inventors: Hiroshi Kataoka, Tokyo; Yuo Umei, Kanagawa, both of Japan

[73] Assignee: Asahi Kasei Kogyo Kabushiki Kaisha, Osaka, Japan

[21] Appl. No.: 66,013
[22] PCT Filed: Sep. 25, 1992
[86] PCT No.: PCT/JP92/01231
 § 371 Date: May 28, 1993
 § 102(e) Date: May 28, 1993
[87] PCT Pub. No.: WO93/06980
 PCT Pub. Date: Apr. 15, 1993

[30] Foreign Application Priority Data

Oct. 1, 1991 [JP] Japan .................. 3-253522

[51] Int. Cl.$^5$ .............. B28B 7/36; B29C 33/56; B29C 45/26
[52] U.S. Cl. .................. 425/526; 249/111; 249/114.1; 249/115; 249/134; 264/337; 425/552
[58] Field of Search ............ 249/111, 114.1, 115, 249/116, 134, 135; 264/337, 338; 428/458, 459; 425/552, 526

[56] References Cited

U.S. PATENT DOCUMENTS

| | | | |
|---|---|---|---|
| 3,544,518 | 12/1970 | Bodkins et al. | 264/328 |
| 3,734,449 | 5/1973 | Itou et al. | 249/134 |
| 3,827,667 | 8/1974 | Lemelson | 249/135 |
| 3,839,075 | 10/1974 | Moriyama et al. | 117/76 A |
| 4,225,109 | 5/1990 | Yotsutsuji et al. | 249/114.1 |
| 4,517,584 | 5/1985 | Matsushita et al. | 357/80 |
| 4,919,388 | 4/1990 | Koike et al. | 249/135 |
| 4,981,631 | 1/1991 | Cheung et al. | 264/50 |
| 4,983,345 | 1/1991 | Kromsey | 249/135 |
| 5,004,627 | 4/1991 | Presswood et al. | 427/133 |
| 5,041,247 | 8/1991 | Kim | 249/116 |
| 5,176,839 | 1/1993 | Kim | 249/114.1 |
| 5,196,506 | 3/1993 | Tamai et al. | 528/353 |
| 5,231,160 | 7/1993 | Tamai et al. | 528/125 |

FOREIGN PATENT DOCUMENTS

| | | | |
|---|---|---|---|
| 55-55839 | 4/1980 | Japan | 249/111 |
| 62-37107 | 2/1987 | Japan | . |

*Primary Examiner*—Khanh Nguyen
*Attorney, Agent, or Firm*—Finnegan, Henderson, Farabow, Garrett & Dunner

[57] ABSTRACT

It has been conventionally considered difficult to adhere a mold metal and a polyimide, etc. whose coefficients of thermal expansion differ from each other by one figure and to retain the adhesion in injection molding, etc. involving severe heating-cooling cycles over several tens of thousands of times. The greatest merit of injection molding resides in that a molded article of complicated shape can be obtained through one shot. It has been demanded to obtain a mirror-smooth injection molded article with good molding surface reproduction without extending the mold-cooling time while retaining this merit. The present invention provides a mold satisfying both of the durability and the demand. The present invention relates to a mold for synthetic resin molding comprising a mold body made of a metal having a heat conductivity of not less than 0.05 cal/cm·sec·°C. at room temperature having provided on the cavity wall thereof a polyimide layer, characterized in that said polyimide layer has a thickness of from 0.02 to 2 mm, has a heat conductivity of not more than 0.002 cal/cm·sec·°C., has a glass transition temperature of not less than 200° C., has been formed by coating a solution of a precursor of a linear high-molecular weight polyimide on the cavity wall followed by heating, has an elongation at break of not less than 10%, and has an adhesive strength of not less than 500 g/10 mm to the cavity wall.

12 Claims, 2 Drawing Sheets

MOLD FOR SYNTHETIC RESIN MOLDING

FIELD OF THE INVENTION

This invention relates to a mold for synthetic resins. More particularly, it relates to an injection mold or a blow mold which withstands tens of thousands of molding cycles.

BACKGROUND OF THE INVENTION

In injection molding of a thermoplastic resin, good reproduction of the molding surface of a mold on the molded articles and satisfactory surface gloss of molded articles can generally be achieved to some extent by increasing the resin temperature or injection pressure.

The greatest factor affecting the surface conditions of resin molded articles is the temperature of a mold. The higher the mold temperature, the better. However, as the mold temperature increases, the mold-cooling time required for cooling and solidification of the plasticized resin must be so extended, resulting in a reduction in molding efficiency.

It has therefore been demanded to establish a molding technique for assuring satisfactory molding surface reproducibility without increasing a mold temperature or without lengthening the cooling time even when a mold temperature is increased. A method of mold heating and cooling by alternately introducing a heating medium and a cooling medium through the respective holes of the mold is currently employed. However, this method involves large consumption of heat and requires a long mold-cooling time.

A method of coating the cavity wall with a substance having a small heat conductivity to improve molding surface reproducibility is disclosed, e.g., in U.S. Pat. No. 3,544,518. Polyethylene terephthalate, polyphenylene sulfide, etc. are mentioned as examples of the substance having a small heat conductivity. Further, a method of providing a heat insulating layer near the molding surface is suggested in WO 89/10829. The publication teaches a method for cooling an injected resin in a mold in which the resin can be slowly cooled with a small difference in temperature between the outer surface and the central portion thereby to provide a strain-free molded article, such as a lens. The means disclosed for slow cooling is a mold structure comprising a mold body having formed thereon a heat insulating layer and, as the outermost layer, a metal layer, such as aluminum or nickel. The purpose of providing the heat insulating layer is to greatly reduce the cooling rate of the heated and injected resin. As the heat insulating layer there are mentioned a liquid crystal polymer plate and a plate of Vespel (molded polyimide, a trade name of E. I. du Pont de Nemours & Co., Inc.) each having a thickness of several millimeters.

Japanese Patent Application Laid-Open No. Sho-62-37107 discloses a mold with an air-permeable heat insulating layer on the surface thereof by which silver streaking, etc. can be prevented. The publication has a mention of polyimide with reference to the heat insulating layer but furnishes no further details.

U.S. Pat. No. 5,004,627 suggests coating a mold with a fluorinated polyimide for the purpose of improving parting properties in injection molding. The fluorinated polyimide used here functions as a parting agent. Fluorine-containing compounds generally exhibit markedly excellent slip properties or parting properties for the same or different materials and are widely employed as lubricants, releasants or parting agents.

In U.S. Pat. No. 5,004,627, the fluorinated polyimide is used as a parting agent taking advantage of these characteristics of fluorine-containing compounds. The fluorinated polyimide cannot be firmly adhered to a metallic mold.

It is difficult, in general, to adhere a polyimide a metal, whose coefficient of thermal expansion differs from that of the polyimide by one figure, with high adhesive strength endurable in a heating-cooling cycle test of several tens of thousands of times.

The most outstanding merit of injection molding resides in that a molded article of complicated shape can be obtained through one shot. It has been demanded to obtain a mirror-smooth injection molded article with good molding surface reproduction without extending the mold-cooling time while retaining the above-mentioned merit of injection molding.

The present invention provides a mold meeting these requirements.

An object of the present invention is to provide a mold, the surface of which is coated with an insulating layer, (1) which can cope with any complicated shape of mold cavity, (2) which involves no great increase of cooling time, (3) which withstands several tens of thousands of molding cycles, and (4) which provides a molded article with excellent molding surface reproducibility, for example, a high-gloss molded article.

In order to accomplish the above object of the present invention, the present inventors have studied a mold coated with a heat insulating layer and found that the following requirements are of great importance with respect to the heat insulating substance to be coated on a mold body, the coating state thereof and the method of coating the same.

That is, the heat insulating layer should substantially be the outermost layer of a cavity wall and be thin; and the heat insulating substance should have low heat conductivity, excellent heat resistance, high tensile strength and high elongation, durability against heating cooling cycles, high surface hardness and excellent wear resistance, easy coating on a mold body, satisfactory adhesion to the mold body, surface polishability, and excellent anticorrosion during formation of the heat insulating layer or during molding of synthetic resins.

The inventors have further investigated a heat insulating substance satisfying all these requirements as well as the coating state and the coating method and, as a result, have reached the present invention.

DISCLOSURE OF THE INVENTION

The above object of the present invention is accomplished by the following mold. That is, the present invention is a mold comprising a mold body made of a metal having a heat conductivity of not less than 0.05 cal/cm·sec·°C. at room temperature, the mold having provided on the cavity wall thereof a polyimide layer, characterized in that said polyimide layer
  has a thickness of from 0.02 to 2 mm,
  has a heat conductivity of not more than 0.002 cal/cm·sec·°C.,
  has a glass transition temperature of not less than 200° C.,
  has been formed by coating a solution of a precursor of a linear high-molecular weight polyimide on the cavity wall followed by heating,
  has an elongation at break of not less than 10%, and has an adhesive strength of not less than 500 g/10 mm to the cavity wall.

The present invention will be explained below in detail.

As previously described, there is much literature relating to a method of coating a mold body made of a metal with a thin heat insulating layer comprising a synthetic resin to improve molding surface reproducibility of molded articles. Conventional molds of this type are applicable as small-scaled molds for molding of small numbers of shots. It has been a common knowledge to use tough materials, such as steel, for forming a large-scaled mold withstanding several tens of thousands of shots. In injection molding, because a synthetic resin is injected at a high speed into a thin-walled mold having a wall thickness of about 2 mm, it has been accepted essential to make a mold cavity of a tough material such as steel in large-scaled injection molding for tens of thousands of shots.

In this connection, the present inventors have continued intensive studies and ascertained that a mold coated with a thin layer of a synthetic resin can be endowed with sufficient durability against several tens of thousands of injection molding cycles by using a heat insulating layer comprising a synthetic resin satisfying certain conditions, thus reaching the present invention.

In injection molding, a heat plasticized resin injected into a mold forms a solidified layer immediately on contact with a cooled mold wall on the contact area. The resin successively injected flows between solidified layers and, on reaching the flow end (flow front), proceeds towards the mold wall, and forms a solidified layer on contact with the mold wall.

That is, the injected resin flows in such a manner that it presses the mold wall vertically without dragging itself on the surface of the mold wall.

Accordingly, where a mold surface is coated with a thin heat insulating layer comprising a selected synthetic resin, such a heat insulating layer does not wear with abrasion by the injected resin and thus withstands injection molding of several tens of thousands cycles.

Materials of the mold body which can be used in the present invention are metals having a heat conductivity of not less than 0.05 cal/cm·sec·°C., including those generally employed for molds for synthetic resin molding, such as iron., steel having an iron content of not less than 50% by weight, aluminum, alloys having an aluminum content of not less than, 50% by weight, zinc alloys, and copper alloys, e.g., a beryllium-copper alloy, with steel being the most preferred.

In the present invention, it is preferable to plate the cavity wall of the mold body with chromium and/or nickel.

Chromium plating and nickel plating are excellent in adhesion to a polyimide and anticorrosion and produces marked effects particularly when applied to the mold of the present invention.

Where a polyimide is coated directly on the mold body surface made of steel, etc., cases are sometimes met in which the mold body surface undergoes denaturation during the coating step to have instable adhesion to a polyimide, which tends to cause peeling. With the mold body surface previously plated with chromium or nickel, such surface denaturation hardly occurs. Moreover, chromium and nickel exhibit higher adhesion to a polyimide as compared with iron and also provide a stable surface, which turned out very favorable to the present invention. Since a mold is repeatedly subjected to heating and cooling during synthetic resin molding, to have stable and high adhesion is of great importance. Chromium plating and/or nickel plating was confirmed to produce significant effects in making the mold of the invention durable against a large number of molding shots. In particular, hard chrome plating was revealed to be the most preferred due to its hardness and excellent scratch resistance.

The chromium plating and/or nickel plating preferably has a thickness of from 0.001 to 0.1 mm. Plating may be either electroplating or chemical plating.

While electroplating is generally carried out the following procedures in that order, the same flow of steps may be adopted in the present invention: Surface finishing, surface cleaning, stop-off, jig fixing, anodic treatment, plating, hydrogen removal, and finishing.

Plating may be single chromium or nickel plating or, if desired, multi-layer plating of copper-nickel-chrome, copper-chrome or copper-nickel.

In general, polyimides are classified into linear type and thermosetting type, and there are various polyimide precursors for each of them as classified as shown in Table 1 below.

TABLE 1

In injection molding in which a heated and plasticized synthetic resin is injected into a cooled mold where it is cooled and thus molded, the mold surface is thus subjected to repetition of heating to a temperature as high as 100° C. followed by cooling for every molding cycle. Because of a difference of coefficient of thermal expansion between a polyimide and a metal, such as iron, by about one figure, a violent stress is exerted on the interface between the metal and the polyimide for every cycle of heating reaching 100° C. and cooling. A polyimide capable of withstanding repetition of stress application tens of thousands of times is required to have high breaking strength and elongation at break and also to exhibit high adhesive strength to the mold. From this point of view, it has been found that a tough linear high-polymer polyimide containing no substance interfering with adhesion to a mold, such as fluorine, is the most preferred.

Specific examples of linear high-molecular polyimides which can preferably be used in the present invention are shown in Table 2 below. In Table 2, Tg is a glass transition temperature, and n is the number of the repeating units.

TABLE 2

| Molecular Structure | Tg (°C.) | Trade Name (Maker) |
|---|---|---|
|  | 428 | Kapton (Toray Industries, Inc.) |
|  | 399 | Novax (Mitsubishi Chemical Corp.) |
|  | 303 | Upilex R (Ube Industries, Ltd.) |
|  | 359 | Upilex S (Ube Industries, Ltd.) |
|  | 256 | LARC TPI (Mitsui Toatsu Chemicals, Inc.) |
|  | 342 | P 12080 (The Upjohn Co.) |
|  | 230 | PAI (Amoco Corp.) |

Tg of linear polyimides varies depending on the constituents. Examples of the constituent and Tg are shown in Tables 3 and 4. According to the inventors' findings, Tg of not less than 200° C., and particularly not less than 230° C. was preferred.

TABLE 3

Tg (°C.) of Various Polyimides

| Ar |  |  |  |  |
|---|---|---|---|---|
|  | — | 442 | 412 | 399 |
|  | | | | |
| X = nil (i.e., single bond) | 360 | — | — | 306 |
| X = O | 342 | 313 | 280 | 270 |
| X = CO | 333 | 300 | 288 | 280 |
| X =  | 226 | 224 | 221 | 221 |

TABLE 4

Tg (°C.) of Polyimides of Formula

| Ar | Tg (°C.) | Ar | Tg (°C.) |
|---|---|---|---|
|  | 315 |  | 285 |
|  | 384 |  | 309 |
|  | 398 | | 373 |
| | 429 | | |

TABLE 4-continued

Tg (°C.) of Polyimides of Formula

| Ar | Tg (°C.) | Ar | Tg (°C.) |
|---|---|---|---|
| | | | 439 |

Injection molding has worth in that a molded article of complicated shape can be obtained through one shot. The inventors have ascertained that formation of a polyimide layer on such a complicated molding surface with firm adhesion can be achieved most preferably by coating a solution of a polyimide precursor, followed by heating to form a polyimide film.

The polyimide to be used in the present invention contains substantially no substance interfering with adhesion to a metal mold, such as fluorine. The polyimide layer is formed by coating a solution of a precursor of a linear high-molecular weight polyimide on the mold wall and then heating. The polyimide is a heat-resistant resin having a glass transition temperature (hereinafter abbreviated as Tg) of not less than 200° C., excellent strength and excellent elongation as having an elongation at break of not less than 10%, and an adhesive strength of not less than 500 g/10 mm to the mold wall.

The linear polyimide precursor can be synthesized by, for example, ring-opening polyaddition reaction of an aromatic diamine and an aromatic tetracarboxylic acid dianhydride:

wherein Ar and Ar' each represent an aromatic compound.

The polyimide precursor undergoes dehydrating cyclization on heating to form a polyimide.

The most preferred linear polyimide precursor to be used in the present invention is a polyamic acid. Typical examples of the repeating units of the polyamic acid and the repeating unit of the polyimide obtained therefrom by imidation are shown below.

"Torayneece 3000" produced by Toray Industries, Inc.

"AI-10" produced by Amoco Japan

"LARC-TPI" produced by Mitsui Toatsu Chemicals, Inc.

The above-mentioned polyimide precursor exhibits good adhesion to a mold because of its polar group, such as a carboxyl group and, on reacting on the surface of a mold, forms a polyimide thin layer with intimate adhesion to the mold surface.

The polyimide precursor is dissolved in a solvent, such as N-methylpyrrolidone, and coated on the mold wall.

The solution of the polyimide precursor may contain additives for adjustment of the viscosity, surface tension or thixotropy at the time of coating and/or trace amounts of additives for increasing the adhesion to a mold. Of these polyimides, pyromellitic acid dianhydride type polyimides (PMDA) are the most preferred because of their high heat resistance and excellent mechanical properties. In particular, varnishes adjusted for coating are preferably employed. Note that additives which may greatly increase the heat conductivity of the polyimide are unfavorable. Similarly, additives which may greatly reduce the adhesion between the polyimide and a mold are also unfavorable.

The polyimide precursor polymer exhibits good adhesion to a mold because of its polar group, such as a carboxyl group and, on reacting on the surface of a mold, forms a polyimide thin layer with intimate adhesion to the mold surface.

The adhesive strength of the polyimide layer to a mold body is not less than 500 g/10 mm, preferably not less than 0.8 kg/10 mm, and more preferably not less than 1 kg/10 mm, at room temperature, in terms of a peel strength as determined in pulling a polyimide layer cut to a width of 10 mm in a direction at right angles to the adhered surface at a pulling speed of 20 mm/min. While the peel strength as above measured shows considerable scatter depending on the location and number of measurements, what is important is that the minimum of measured values is high, and it is preferable that the polyimide layer stably exhibits a high level of peel strength. The adhesive strength as referred to in the present invention is the minimum of the adhesive strength measured values as measured in the main portion of a mold. More stable adhesive strength can be obtained where a mold body is chrome- or nickel-plated.

It is preferable that the heat conductivity of the polyimide is as small as possible. Polyimides having a heat conductivity of not less than 0.002 cal/cm·sec·°C. are preferably used.

The thickness of the polyimide layer is selected appropriately within a range of from 0.02 to 2 mm. With a thickness less than 0.02 mm, the effects of improving surface properties of molded articles are reduced. With a thickness exceeding 2 mm, the mold-cooling effect will be reduced, resulting in a reduction in molding efficiency. The higher the mold temperature, the thinner the polyimide layer should be made. The lower the mold temperature, the thicker the polyimide layer should be made. The thickness is selected appropriately within a range of from 0.02 to 2 mm. A preferred thickness of the polyimide layer also depends on the molding method in which the mold of the present invention is used. A preferred thickness for injection molding, in which the advantages of the mold of the present invention can be fully taken of, ranges from 0.02 to 0.5 mm, and more preferably from 0.05 to 0.2 mm; and that for blow molding ranges from 0.1 to 1 mm. Where, as hereinafter described, a polyimide layer has a non-uniform thickness as shown in FIG. 2, the term "thickness of a polyimide layer" as used herein means the maximum thickness thereof.

The linear high-molecular weight polyimide to be used in the present invention is required to have high strength and high elongation. It is particularly essential for resistance to heating-cooling cycles to have a high elongation at break. A required elongation at break is not less than 10%, and preferably not less than 20%, as measured according to ASTM D638.

In general, injection molded articles, particularly large-sized articles, shows satisfactory reproduction of the molding surface to give satisfactory gloss in the vicinities of the inlet for a resin (hereinafter referred to as a gate) where the injection pressure is easily conducted. The farther from the gate, the poorer the molding surface reproducibility. The resin flow end is the poorest. In cases where a molded article had a thin wall, where the resin has a high viscosity, or where a molded article has a large size, the difference in appearance between the gate portion and the resin flow end portion is particularly conspicuous.

The present invention also provides a mold which eliminates the above-mentioned problem. That is, there is provided a mold in which the thickness of the polyimide layer increases from the gate portion toward the flow end portion. The term "gate portion" as used herein means the vicinities of a generally employed gate, including a direct gate, a pinpoint gate, and a side gate, Since some portions of injection-molded articles demand a good appearance and some do not, the position of a gate is usually decided within the portion not requiring an appearance. Therefore, the thickness of the polyimide layer in the portion which demands a good appearance and is closest to the gate is called "a polyimide layer thickness in the gate portion". In other words, where coating of a polyimide starts from a gate, the "gate portion" means the mold wall from the gate up to about 1/10 the distance between the gate and the flow end. Where coating of a polyimide starts from a position several tens of millimeters apart from a gate, with the wall in the close vicinities of the gate being uncoated, the "gate portion" means the portion of the mold wall where coating of the polyimide begins. The thickness of the polyimide at this portion is used.

The term "flow end portion" as hereinafter used means the portion which demands a good appearance and is closest to the resin flow end, i.e., the mold wall from the flow end up to about 1/10 the distance between the flow end and a gate. In the present invention, the thickness of the polyimide layer in the flow end portion is 1.1 to 4 times, preferably 1.2 to 3 times, and more preferably 1.3 to 2.5 times, the thickness of the polyimide layer in the gate portion.

A pressure loss of a fluid flowing between parallel plates is generally represented by equation:

$$\Delta P = \beta \times L\eta Q/H^2$$

wherein $\Delta P$ is a pressure loss; $\eta$ is a viscosity; $Q$ is a flow rate; $H$ is a distance between parallel plates; $\beta$ is a constant; and $L$ is a flow distance.

That is, a pressure loss is in proportion to viscosity and flow distance and in inverse proportion to the square of distance between parallel plates.

In the case of injection molding, the farther from a gate, the greater the pressure loss and the lower the resin pressure imposed on a mold wall as understood from the above equation. A pressure of a resin injected under an injection pressure of 1000 kg/cm$^2$ usually decreased to several tens of kilograms per cm$^2$ at the flow end, though somewhat varying depending on the shape of the mold cavity, the position of the gate, and the kind of the resin. Accordingly, since the pressure of the resin imposed to the mold wall is considerably reduced at the flow end, the molding surface reproducibility becomes poor at this portion only to provide low gloss. In the case where L and $\eta$ in the above equation are large, i.e., where a molded article has a large size and the resin has no easy processing, this difference becomes conspicuous.

The present invention settles the problems occurring in the above-mentioned situation.

When a heat-plasticized resin is injected into a cooled mold made of a metal having high heat conductivity, the resin is cooled and solidified immediately on contact with the mold wall before the injection pressure is sufficiently applied to the resin in contact with the mold wall. In order to achieve sufficient molding surface reproduction, it is necessary that the injection pressure be sufficiently imposed to the resin contacting the mold wall while the resin is maintained at a temperature above the softening point. Where a plasticized resin is injected into a mold coated with a heat insulating substance, the mold wall is temporarily heated by the heat of the injected resin so that the injection pressure may be applied at a temperature above the softening point thereby achieving sufficient reproduction of the molding surface.

As the polyimide layer thickness becomes larger, the time period during which the mold wall is kept at a temperature above the resin softening point is lengthened to improve molding surface reproducibility. In the present invention, the molding surface reproduction of injection molded articles can be leveled by increasing the thickness of the heat insulating layer in the resin flow end portion where molding surface reproducibility is poor.

Because a mold cavity for injection molding generally has a complicated shape, the decrease in injection pressure is dependent on not only the flow distance L but the distance between parallel plate H (corresponding to the thickness of the cavity), the resin viscosity, etc. Molding surface reproducibility is correlated to an injection pressure distribution immediately after a mold cavity is filled with a resin. In the present invention, it is preferable that the polyimide layer thickness distribution is in an inverse relation to the injection pressure distribution in the cavity. That is, it is preferable that the polyimide layer thickness is made thinner at the portion where a higher inner pressure is applied immediately after resin filling, while it is made thicker at the portion where the inner pressure is lower.

The greatest merit of injection molding consists in that a molded article of complicated shape can be obtained through one shot. Thus, a mold cavity generally has a complicated shape. It is very difficult to apply a coating substance on such a complicated cavity wall while making a mirror surface and, therefore, surface polishing after coating is the most effective means for mirror finish. To this effect, the coated layer is required to have polishability to afford a mirror surface.

Polishing of a synthetic resin for removing unnecessary parts and affording a mirror surface is a widespread means in the field of plastic lenses. In polishing with an abrasive, etc., it is necessary to choose a synthetic resin suited for polishing. Well-known CR-39 (diethylene glycol bisallylcarbonate) polymer, etc. are suitable. That is, it is generally accepted that resins having a highly crosslinked structure to have hardness and small elongation and also having a high glass transition temperature are suited for polishing. To the contrary, linear high-molecular resins having a large elongation at break and high toughness have been believed unsuitable for polishing.

From this standpoint, linear high-molecular weight polyimides are naturally regarded unsuitable for polishing due to the large elongation at break and toughness. However, the present inventors have first proved that such linear high-molecular weight polyimides as well as highly crosslinked thermosetting polyimide exhibit satisfactory polishability and can therefore be used with satisfaction in the present invention.

If desired, the surface smoothness or scratch resistance of the polyimide thin layer maybe further improved by coating other materials on the polyimide layer to a thickness not more than 1/10 the polyimide layer thickness. This embodiment is also included under the scope of the present invention. Coatings generally called hard coats which are currently applied to synthetic resin sheets or molded articles for improving scratch resistance can also be used. For example, hard coat agents comprising thermosetting silicone can be used satisfactorily in the present invention.

On the other hand, molds are sometimes demanded to have a satinized surface, a leather-grained surface, a matted surface, and the like. The polyimide layer may be formed in agreement with these demands. For example, a polyimide layer with a satinized surface, a leather-grained surface, a matted surface, etc. can be formed by a process comprising etching a mirror-smooth surface of a polyimide layer with an alkali, e.g., NaOH, KOH, hydrazine, etc.; a process comprising coating a polyimide precursor solution on a mold body, heating the coated solution to evaporate the solvent, spraying a solvent, e.g., N-methylpyrrolidone, thereon appropriately, followed by heating; or a process comprising subjecting a polyimide layer formed to sand-blasting.

Synthetic resins which can be molded in the mold according to the present invention are thermoplastic resins commonly applied to injection molding, blow molding, and the like. Examples include general thermoplastic resins such as styrene polymers or copolymers, polyolefin polymers or copolymers, e.g., polyethylene and polypropylene, vinyl chloride polymers or copolymers, polyacetal, polyamide, and polyester.

When these resins are compounded with various reinforcing materials or fillers or formulated into polymer alloys, particularly noticeable effects are manifested. For example, these resins may be compounded with one or more of rubber, glass fibers, asbestos, calcium carbonate, talc, calcium sulfate, blowing agents, and woodmeal. Recycled resins containing foreign matters such as waste and paint powder can also used satisfactorily in the present invention.

It is necessary that a heat-melted synthetic resin injected into a mold cavity be pressed onto the mold wall under high pressure while being kept at a temperature above its softening point. Hence, the mold of the present invention is particularly effective in high-speed injection molding. The high-speed injection molding is an injection molding method in which the injection time per shot is less than 1 second. The injection time in high-speed injection molding is preferably not more than 0.5 second, and more preferably not more than 0.3 second.

The above-mentioned high-speed injection with an injection time of less than 1 second means that the time required for a heat-plasticized resin having entered the cavity from the gate to reach the farthest end of the cavity is less than 1 second. In the case where plurality of gates are used, it is the time period of from the time when a synthetic resin first begins to enter into the cavity to the time when the cavity is filled with the resin. After the heat-plasticized synthetic resin reaches the end of the cavity, application of the injection pressure to the synthetic resin continues to give a high pressure, and injection of the synthetic resin further continues so as to make up the shrinkage on cooling.

Surface properties of molded articles may further be improved by introducing a heated fluid, such as a gas, into the mold cavity immediately before molding. By introduction of a heated fluid, such as a gas, into the cavity, the cavity-forming wall can be selectively heated.

The temperature of the heated gas to be introduced into the mold cavity is set higher than the mold temperature. Greater results are obtained by introducing a high-temperature gas in a short time. The gas temperature is preferably higher than the mold temperature by at least 100° C., more preferably at least 200° C., and most preferably at least 300° C.

A heated gas may be introduced into the cavity by various methods. For example, small holes of the size permitting passage of gas but not of a molten resin are provided, through which a heated gas is introduced. Accordingly, the small holes should be provided at positions suited for introduction and discharge of the heated gas. While the size of the small holes which permit passage of gas but not of a molten resin varies depending on the kind of the resin, molding conditions, and the like, slits having a gap of 0.01 to 0.2 mm are usually suitable. In the case of ordinary molds which are not airtight, the parting line usually serves as such slits. In cases where the parting line is airtight, the above-mentioned small holes or slits are separately provided for gas introduction.

While the present invention has been explained chiefly with respect to injection molding, the mold of the present invention is applicable to blow molding as well.

Figure 1:
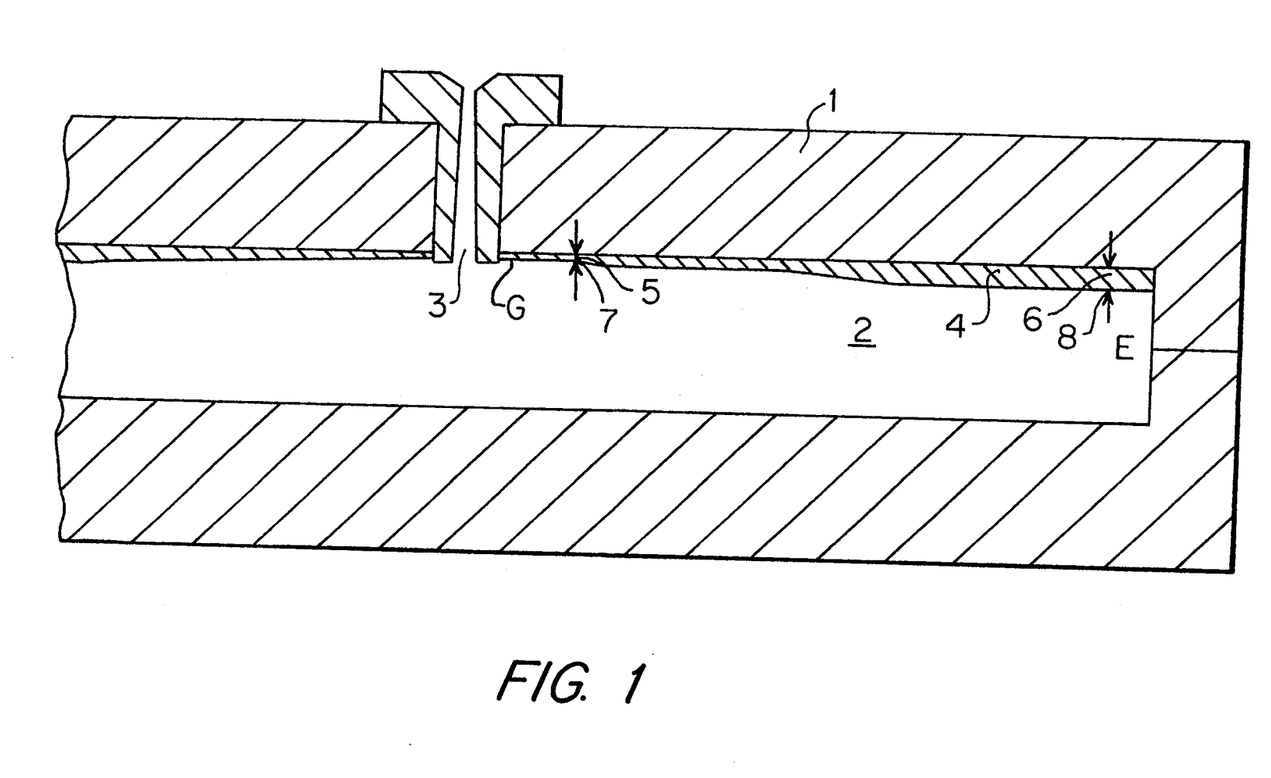
FIG. 1 is a partial cross section of a mold according to the present invention.
Figure 2A:
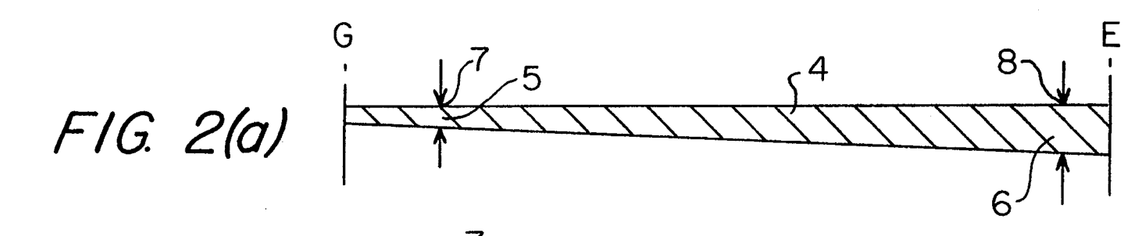
FIGS. 2(a) to 2(d) are cross sections of an example of a heat insulating resin layer according to the present invention.
Figure 2B:
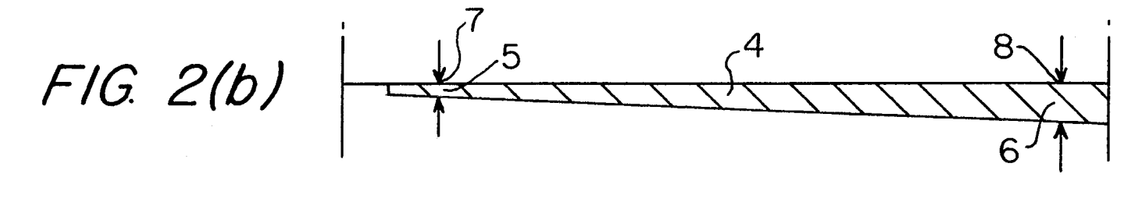
Figure 2C:
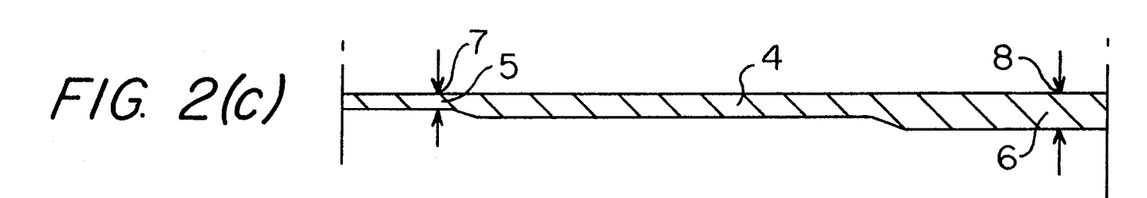
Figure 2D:
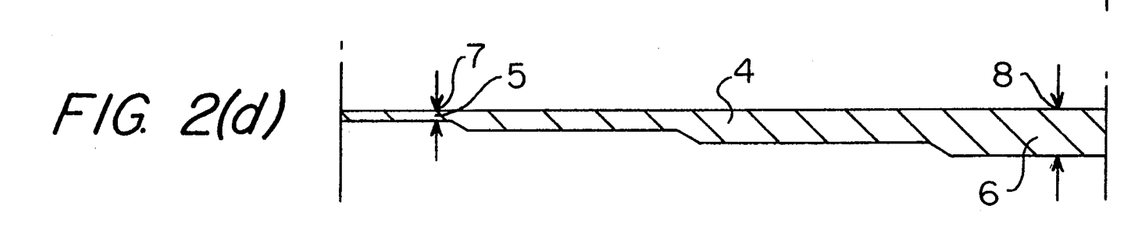

The present invention is illustrated below by referring to accompanying drawings. In FIG. 1 is shown a cross section of a mold according to the present invention which is composed of mold body 1 made of a metal having a heat conductivity of not less than 0.05 cal/cm·sec·°C., the wall surface of the mold body forming mold cavity 2 being coated with polyimide layer 4. Synthetic resin is injected through gate 3 and flows starting from the immediate vicinity of the gate G toward resin flow end E. Polyimide layer 4 has its thickness increased toward resin flow end E. Polyimide layer thickness 6 in resin flow end portion 8 is 1.1 to 4 times polyimide layer thickness 5 in gate portion 7.

The mode of increase of the polyimide layer thickness from gate portion G toward flow end portion includes several embodiments as shown in FIGS. 2-(a) through (d). (a) illustrates continuous increase starting from the immediate vicinity G of the gate; (b) no polyimide layer in the immediate vicinity of the gate; and (c) and (d) stepwise increase. In (c) and (d), the difference in level is preferably made at a mild slope by polishing.

DESCRIPTION OF SYMBOLS

1 . . . Mold body
2 . . . Mold cavity
3 . . . Gate
4 . . . Polyimide layer
5 . . . Polyimide layer thickness in gate portion
6 . . . Polyimide layer thickness in resin flow end portion
7 . . . Gate portion
8 . . . Resin flow end portion
G . . . Immediate vicinity of gate
E . . . Resin flow end

PREFERRED EMBODIMENT OF THE INVENTION

Molds and polyimides used in the following Examples were as follows.
(1) Mold:
Mold Body (A)
  Made of steel (S 55 C); having a flat cavity of 100 mm×100 mm×2 mm (t) with a mirror molding surface; heat conductivity of the steel of about 0.2 cal/cm·sec·°C.; and having a side gate at the side of the square.
Mold Body (B)
  Mold body (A) having 0.2 mm thick mirror-smooth hard chrome plating on the surface thereof by electrolytic plating.
(2) Polyimide:
Polyimide (A)
  Linear polyimide precursor, polyimide varnish "Torayneece #3000" produced by Toray Industries, Ltd. Providing, upon curing, a polyimide having a Tg of 300° C., a heat conductivity of 0.0005 cal/cm·sec·°C., and an elongation at break of 60%.
Polyimide (B)
  Linear polyimide precursor, polyimide varnish "LARC-TP1" produced by Mitsui Toatsu Chemicals, Inc. Providing, upon curing, a polyimide having a Tg of 256° C., a heat conductivity of 0.0005 cal/cm·sec·°C., and an elongation at break of 25%.
Polyimide (C)
  Linear polyimide precursor, polyamideimide "AI-10" produced by Amoco Japan, Ltd. Providing, upon curing, a polyimide having a Tg of 230° C., a heat conductivity of 0.0005 cal/cm·sec·°C., and an elongation at break of 40%.

EXAMPLE 1

Three mold bodies (A) having been abraded with sand paper, etc. to have a different surface roughness and one mold body (B) were used. After thoroughly degreasing the molding surface, polyimide (A) was coated thereon and heated at a temperature stepwise increasing in the order of 120° C., 210° C., and 290° C. The polyimide coating and the subsequent heating were repeated three times to form a polyimide layer. The polyimide layer was then polished with a buff while applying a diamond paste by means of an electric grinder to form a mirror-finished linear polyimide coating layer having a thickness of 0.05 mm.

The coating layer was cut to a width of 10 mm and pulled at a right angle with the coated surface at a speed of 20 mm/min to measure the adhesive strength. The results obtained are shown in Table 5.

It is seen that the adhesive strength between the mold body and the polyimide layer was 0.6 kg/10 mm or more in each case. The adhesive strength between hard chrome-plated mold body (B) and polyimide (A) was as high as 2 kg/10 mm with little scatter and was thus proved very favorable. It is important that the minimum value of the adhesive strength should be large.

TABLE 5

| Mold Body | Grade Number of Sandpaper | Mold Surface Roughness ($R_{max}$) (μm) | Adhesive Strength (kg/10 mm) |
|---|---|---|---|
| (A) | #180 | 5.3 | 0.6–1.0 |
| (A) | #1000 | 0.2 | 1.1–2.0 |
| (A) | buffing | 0.2 | 1.1–2.0 |
| (B) | — | 0.2 | 2.0–2.2 |

EXAMPLE 2

Four mold bodies (B) were prepared. In the same manner as in Example 1, each mold was thoroughly degreased and coated with polyimide (A), (B) or (C) to form a mirror-finished linear polyimide coating layer having a thickness of 0.04 mm or 0.1 mm.

Rubber-reinforced polystyrene #495 (produced by Asahi Chemical Industry Co., Ltd.) was injection molded by using the thus prepared polyimide-coated mold or mold body (B), and the gloss of the resulting molded article was measured. The results obtained are shown in Table 6 below. There was the similar results in polyimides (A), (B) and (C). Where a polyimide layer was provided, the resulting molded articles exhibited markedly improved gloss. Even after 10,000 injection cycles, there was observed neither unsound molded surface conditions nor reduction in gloss.

The conditions for injection molding and gloss measurements were as follows.
Injection Molding Conditions:
Injection Cylinder Temperature: 220° C.
Mold Temperature: 60° C.
Injection Speed X: injection time=1.1 sec
Injection Speed Y: injection time=0.2 sec
Gloss Measurement Conditions:
JIS K7105; an angle of reflection: 60°

TABLE 6

| Mold | Gloss X | Gloss Y |
|---|---|---|
| Mold body (B) | 40% | 50% |
| Mold body (B) having a 0.04 mm thick polyimide layer | 90% | 96% |
| Mold body (B) having a 0.1 mm thick polyimide layer | 99% | 99% |

EXAMPLE 3

On the 0.04 mm or 0.1 mm thick mirror-finished linear polyimide layer which was formed on the mold surface according to the procedure of Example 2 was a coated silane coupling agent "KBE 903" (product of Shin-Etsu Chemical Industry Co., Ltd.) and heated at 120° C. for 10 minutes to form a thin film having a thickness of not more than 0.1 μm. On the silane coupling agent layer was further coated a silicone hard coat agent "X-12-2150 A/B" (product of Shin-Etsu Chemical Industry Co., Ltd.) and heated at 120° C. for 10 minutes to form a thin layer having a thickness of about 1 μm to provide a silicone hard coat.

Injection molding was carried out by using the resulting mold in the same manner as in Example 2. As a result, injection molded articles with equally high gloss were obtained. By providing a silicone hard coat layer as the outermost layer, the mold can be protected from scratches during handling.

EXAMPLE 4

Rubber-reinforced polystyrene "#495" (produced by Asahi Chemical Industry Co., Ltd.) was injection molded in each of molds prepared by using the following mold body and polyimide.
Mold Body:
  Made of steel (S 55 C); having a cavity of 70 mm×380 mm3 mm (t); with the cavity-forming wall mirror-finished by polishing and then provided with hard chromium plating.
Polyimide:
  Polyimide (A) was coated on the mold body and heated to form a polyimide, which was then polished to have a mirror surface.

The cavity-forming wall surface of the mold was provided with each of the following three layers.
Cr plating: Hard chrome plating on the entire surface.
0.05 mm Thick PI:
  A 0.05 mm thick polyimide layer on the entire surface.
PI with varied thickness:
  A polyimide layer on the entire area, the polyimide coverage being varied so as to give a thickness of 0.04 mm in the gate portion corresponding to 15% area, 0.08 mm in the resin flow end portion corresponding to 20% area, and 0.06 mm in the portion therebetween corresponding to 65% area, with the difference in level being made at a mild slope by polishing.

The molded articles obtained by injection molding using each of the three molds were evaluated for gloss at the positions described below according to JIS K7105 (angle of reflection: 60°).
Gate portion:
  A position apart from the gate at a distance of 10% of the distance between the gate and the resin flow end.
Middle:
  A position in the middle between the gate and the resin flow end.
Resin flow end portion:
  A position apart from the gate at a distance of 90% of the distance between the gate and the resin flow end.

The results obtained are shown in Table 7 below.

TABLE 7

| | Gloss (%) | | |
|---|---|---|---|
| Mold Surface | Gate Portion | Middle | Flow End Portion |
| Cr Plating | 55 | 48 | 35 |
| 0.05 mm Thick PI | 91 | 82 | 70 |
| PI with varied thickness | 87 | 87 | 85 |

It is seen that gloss can be considerably improved by coating a molding surface with a polyimide and that the gloss can be leveled over the entire surface of the article by PI with varied thickness.

COMPARATIVE EXAMPLE

A solution of a fluorinated polyimide precursor having the structural unit shown below was coated on mold body (A) and heated to form a fluorinated polyimide layer having a thickness of 0.05 mm.

The adhesive strength between the polyimide layer and the mold was from 0.2 to 0.4 kg/10 mm, showing large scatter depending on the location of measurements. Such a low-adhesive heat insulating layer fails to withstand injection molding attended by severe heating-cooling cycles over tens of thousands of times.

INDUSTRIAL UTILITY OF THE INVENTION

The mold according to the present invention can provide synthetic resin molded articles with high mirror gloss irrespective of the shape while achieving a reduction in mold-cooling time and retaining molding surface reproducibility over several tens of thousands of molding cycles.

What is claimed is:

1. A mold for synthetic resin molding comprising a mold body made of a metal having a heat conductivity of not less than 0.05 cal/cm·sec·°C. At room temperature, said mold having provided on the cavity wall thereof a polyimide layer, wherein said polyimide layer
   has a thickness of from 0.02 to 2 mm,
   has a heat conductivity of not more than 0.002 cal/cm·sec·°C.,
   has a glass transition temperature of not less than 200° C.,
   has been formed by coating a solution of a precursor of a linear high-molecular weight polyimide on the cavity wall followed by heating,
   has an elongation at break of not less than 10%, and
   has an adhesive strength of not less than 500 g/10 mm to the cavity wall.

2. The mold according to claim 1, wherein said mold body has thereon a plating material from the group consisting of chromium and nickel on which said polyimide layer is formed.

3. The mold according to claim 1 or 2, wherein said polyimide layer has a polished smooth surface.

4. The mold according to claim 1, wherein said mold is a mold for injection molding.

5. The mold according to claim 4, wherein the thickness of said polyimide layer is increased from a gate portion toward a resin flow end.

6. The mold according to claim 4, wherein said polyimide layer has a relatively small thickness at the portion where a relatively high inner pressure is applied immediately after the cavity is filled with the synthetic resin, relatively a large thickness at the portion where said inner pressure is relatively low.

7. The mold according to claim 3, wherein said mold is a mold for blow molding.

8. The mold according to claim 3, wherein said mold is a mold for injection molding.

9. The mold according to claim 8, wherein the thickness of said polyimide layer is increased from a gate portion toward a resin flow end.

10. The mold according to claim 8, wherein said polyimide layer has a relatively small thickness at the portion where a relatively high inner pressure is applied immediately after the cavity is filled with the synthetic resin, a relatively large thickness at the portion where said inner pressure is relatively low.

11. The mold according to claim 4, wherein the thickness of said polyimide layer increased from a gate portion toward a resin flow end.

12. The mold according to claim 1, wherein said mold is a mold for blow molding

* * * * *